(12) United States Patent
Palmlöf et al.

(10) Patent No.: US 8,450,426 B2
(45) Date of Patent: May 28, 2013

(54) MULTIMODAL POLYETHYLENE RESIN FOR PIPE MADE BY A SINGLE-SITE CATALYST

(75) Inventors: Magnus Palmlöf, Västra Frölunda (SE); Solveig Johansson, Stenungsund (SE); Per-Ola Hagstrand, Stenungsund (SE); Sune Olsson, Ödsmål (SE)

(73) Assignee: Borealis Technology Oy, Porvoo (FI)

( * ) Notice: Subject to any disclaimer, the term of this patent is extended or adjusted under 35 U.S.C. 154(b) by 425 days.

(21) Appl. No.: 12/517,103

(22) PCT Filed: Nov. 21, 2007

(86) PCT No.: PCT/EP2007/010092
§ 371 (c)(1), (2), (4) Date: Jun. 30, 2009

(87) PCT Pub. No.: WO2008/064809
PCT Pub. Date: Jun. 5, 2008

(65) Prior Publication Data
US 2011/0111152 A9 May 12, 2011

(30) Foreign Application Priority Data
Dec. 1, 2006 (EP) ..................................... 06024952

(51) Int. Cl.
*C08L 23/02* (2006.01)
(52) U.S. Cl.
USPC ........................................... 525/240; 428/36
(58) Field of Classification Search
USPC ........................................... 525/240; 428/36
See application file for complete search history.

(56) References Cited

U.S. PATENT DOCUMENTS

| 5,338,589 | A | 8/1994 | Böhm et al. |
| 6,441,096 | B1 * | 8/2002 | Backman et al. .............. 525/240 |
| 2007/0273066 | A1 * | 11/2007 | Johansson et al. ............ 264/454 |

FOREIGN PATENT DOCUMENTS

| WO | 0022040 | 4/2000 |
| WO | 0234829 | 5/2002 |
| WO | 03020821 | 3/2003 |
| WO | 03033586 | 4/2003 |
| WO | 03066698 | 8/2003 |
| WO | 03066699 | 8/2003 |
| WO | 2004048468 | 6/2004 |
| WO | WO 2004048468 A1 * | 6/2004 |
| WO | 2005095509 | 10/2005 |

\* cited by examiner

*Primary Examiner* — Kelechi Egwim
(74) *Attorney, Agent, or Firm* — Milbank, Tweed, Hadley & McCloy LLP

(57) ABSTRACT

The present invention relates to a polyethylene composition comprising a polyethylene base resin, which comprises
 a. an ethylene copolymer as fraction (A), and
 b. an ethylene homo- or copolymer as fraction (B),
with fraction (A) having a lower molecular weight than fraction (B), wherein the polyethylene base resin is obtainable in a polymerisation process in which a single-site catalyst. (SSC) is used in the polymerisation of at least one of fractions (A) and (B), and the base resin has
 (i) a density of below 940 kg/m$^3$, and
 (ii) a MFR$_2$ at 190° C./2.16 kg of 0.001 to 10 g/10 min, and
the composition has
 (iii) a flexural modulus of from 300 to 820 MPa, and
to a process for the production of such a composition, and to a pipe produced from such a composition.

11 Claims, No Drawings

MULTIMODAL POLYETHYLENE RESIN FOR PIPE MADE BY A SINGLE-SITE CATALYST

This application is based on International Application PCT/EP2007/010092 filed Nov. 21, 2007, which claims priority to European Patent Application No. 06024952.1, filed on Dec. 1, 2006, the disclosures of which are incorporated by reference herein in their entireties.

The present invention relates to a polyethylene composition comprising a polyethylene resin produced by a polymerisation process in the presence of a single-site catalyst (SSC). Furthermore, the present invention relates to the use of such a polyethylene composition for the production of pipes, and to pipes, in particular to pressure pipes, made of such a polyethylene composition.

Pipes, in particular pressure pipes, are used in various applications like the transport of drinking water, sewage, different industrial applications, gas and more.

Based on the polymer strength, polyethylene pipes for pressurised systems can be classified in different categories, such as PE63, PE80 or PE100. The higher the number, the longer the service life under high pressure.

Presently, the best polyethylene resins for pressure pipes are prepared in a multistage process with Ziegler-Natta catalysts. The densities of such polyethylene resins are high in order to reach a high pressure resistance of the pipes produced. However, high density gives a high stiffness, which is a drawback e.g. when installing the pipes.

In the end of the 80ies Kaminsky et al. presented a metallocene catalyst type of single-site catalysts. Intensive research on metallocene catalysts has been done but still the introduction of polyolefin resins prepared by metallocene catalysts into the market is low. The main areas where single-site resins have been introduced are film or extrusion coating as disclosed in e.g. WO 03/066699. The films disclosed in this document have excellent mechanical properties and outstanding sealability.

However, it is known that the catalytic activity of single-site catalysts is moderate and the highest activity is reached in the medium to low density regions.

To meet the PE80 requirements with multimodal polyolefin resins manufactured by conventional Ziegler-Natta catalyst, the density must be at least 940 kg/m$^3$, and to meet PE100 requirements the density must even be above 945 kg/m$^3$. Pressure pipe resins prepared by single-site catalysts of the state of the art, as it is described e.g. in WO 02/34829, also have a density higher than 940 kg/m$^3$. The consequence of the use of such high density resins is that the flexibility of the pipes produced therefrom is rather low.

Furthermore, for the production of pressure pipes it is necessary that the polyethylene compositions used have a suitable melt flow rate and molecular weight distribution, in order to ensure a good processability of the composition during the extrusion process.

Hence, the object of the present invention is to provide a polyethylene composition for the manufacturing of pipes, especially pressure pipes, which simultaneously has a good processability, is flexible enough for easy handling and fulfils the requirements of pressure class PE63 or higher.

It has now surprisingly been found that such a polyethylene composition can be provided if a single-site catalyst is used in its production, and the base resin of the composition has a density of below 940 kg/m$^3$.

Therefore, the present invention provides a polyethylene composition comprising a polyethylene base resin, which comprises a. an ethylene copolymer as fraction (A), and
b. an ethylene homo- or copolymer as fraction (B), with fraction (A) having a lower molecular weight than fraction (B), wherein the polyethylene base resin is obtainable in a polymerisation process in which a single-site catalyst (SSC) is used in the polymerisation of at least one of fractions (A) and (B), and the base resin has (i) a density of below 940 kg/m$^3$, and
(ii) a MFR$_2$ at 190° C./2.16 kg of 0.01 to 10 g/10 min, and the composition has
(iii) a flexural modulus from 300 to 820 MPa.

As demonstrated below, the invention enables preparation of more flexible pipes still meeting the requirements for high pressure resistance.

Hence, for example, the compositions of the invention allow for the production of more flexible pipes which can be bended more easily and thus more easily be coiled into a roll. This offers the advantage that installing the pipes is much simplified.

At the same time, a much improved pressure resistance is obtained so that the pipes can be used for applications for which conventionally only pipes made of a polyolefin composition with higher density could be used.

The term "base resin" denotes the entirety of polymeric components in the polyethylene composition according to the invention, usually making up at least 90 wt % of the total composition. Preferably, the base resin is consisting of fractions (A) and (B), optionally further comprising a prepolymer fraction in an amount of up to 20 wt %, preferably up to 10 wt %, more preferably up to 5 wt % of the total base resin.

The density of the base resin contained in the polyethylene composition of the present invention lies in the medium range, i.e. below 940 kg/m$^3$, more preferably in the range of 910 to below 940 kg/m$^3$, even more preferably in the range of 915 to below 940 kg/m$^3$, and most preferably in the range of 920 to below 939 kg/m$^3$, measured according to ISO 1183.

Despite a 5 to 10 kg/m$^3$ units lower density of the base resin compared to conventional resins, the pipes made of the composition of the invention fulfill high pressure classifications.

The melt flow rate (MFR) and the flow rate ratio (FRR) are important properties of the polyethylene base resin, because MFR and FRR are indications of the flowability and thus processability of the polymer. The higher the melt flow rate, the lower the viscosity of the polymer. The MFR is measured according to ISO 1133, indicated in g/10 min and determined at a temperature of 190° C. and different loadings such as 2.16 kg (MFR$_2$; ISO 1133), 5.0 kg (MFR$_5$; ISO 1133) or 21.6 kg (MFR$_{21}$; ISO 1133). The flow rate ratio, FRR is the ratio between MFR$_{weight1}$ and MFR$_{weight2}$, i.e. FRR$_{21/5}$ means the ratio between MFR$_{21}$ and MFR$_5$.

In the present invention, the polyethylene base resin preferably has an MFR$_2$ of 0.01 to 5.0 g/10 min, more preferably of 0.02 to 1.0 g/10 min, and most preferably of 0.10 to 0.50 g/10 min.

The modulus of elasticity (E-modulus) is determined according to ISO 527. The polyethylene composition according to the present invention preferably has a modulus of elasticity from 400 to 900 MPa, more preferable from 425 to 850 MPa, and most preferably from 450 to 800 MPa.

It is furthermore preferred that the flexural modulus of the polyethylene composition is from 400 to below 800 MPa, more preferably from 450 to 700 MPa, and most preferably from 450 to 650 MPa.

Charpy impact test at low temperature assesses impact toughness and therefore provides a way to evaluate resistance to rapid crack propagation (RCP).

In a preferred embodiment of the present invention, the polyethylene composition has a Charpy impact strength at 0° C. of at least 8 kJ/m$^2$, and more preferably of at least 10 kJ/m$^2$, measured according to ISO 179.

The rapid crack propagation resistance of polyethylene compositions may also be determined by a method called S4 (Small Scale Steady State), which has been developed at Imperial College, London, and is described in ISO 13477: 1977 (E). The pipes of the present invention preferably reach a critical temperature, i.e. RCP-S4 value, of +2° C. or lower, more preferably of +1° C. or lower.

The slow crack propagation resistance may be determined according to ISO 13479:1997 in terms of the number of hours a notched pipe withstands a certain pressure at a certain temperature before failure.

The polyethylene composition of the pipe according to the present invention preferably has slow crack propagation resistance of at least 165 hours, more preferably of at least 500 hours, still more preferably of at least 1000 hours, and most preferably of at least 4000 hours, at 5.4 MPa hoop stress and 80° C. according to ISO 1167.

A further important pipe property is the design stress rating, which is the circumferential stress a pipe is designed to withstand for 50 years without failure and is determined at different temperatures in terms of the Minimum Required Strength (MRS) according to ISO/TR 9080. Thus, MRS 8.0 means that the pipe is a pipe withstanding a hoop stress of 8.0 MPa gauge for 50 years at 20° C., and similarly MRS 10.0 means that the pipe with-stands a hoop stress of 10 MPa gauge for 50 years at 20° C.

The polyethylene composition of the pipe according to the invention preferably has a MRS rating of at least 6.3, more preferably of at least 8.0, and most preferably of 10.0.

The shear thinning index (SHI) is the ratio of the viscosities of the polyethylene base resin at different shear stresses and may serve as a measure of the broadness of the molecular weight distribution. In the present invention, the shear stresses at 2.7 kPa and 210 kPa as well as at 5 kPa and 300 kPa are used for the determination of SHI of the polyethylene base resin. The definition and measurement conditions are described in detail on page 8, line 29 to page 11, line 25 of WO 00/22040.

The polyethylene base resin has preferably an $SHI_{(2.7/210)}$ of below 20, more preferably of below 15, and most preferably of below 10. It is preferred the range of $SHI_{(2.7/210)}$ is from 1 to below 20.

It is also preferred that the $SHI_{(5/300)}$ is below 35, more preferred below 30 and most preferred below 25. The preferred range of the $SHI_{(5/300)}$ is between 5 to below 35.

It should be noted that the polyethylene composition of the present invention, and therefore also the pipes produced therefrom, is characterized not by a single one of the above defined features, but by the combination of all features as defined in claim 1. By the unique combination of the features it is possible to obtain a polymer composition for pipes of superior performance, in particular with regard to flexibility, processability, pressure performance, impact strength, slow crack and rapid crack propagation resistance.

Moreover, it is significant to point out the importance of a good processability of the polyethylene composition intended for pipe applications. High molecular weight is needed for meeting good pressure resistance and low creep. Improved processability is reached by the multimodal design. This means at least one low molecular weight fraction giving easier processability and one fraction with a high molecular weight contributing to mechanical strength, are present in the composition used for pipes of the invention.

Usually, a polyethylene composition comprising at least two polyethylene fractions which have been produced under different polymerisation conditions resulting in different (weight average) molecular weights for the fractions, is referred to as "multimodal". The prefix "multi" relates to the number of different polymer fractions the composition is consisting of. Thus, for example, a composition consisting of two fractions only is called "bimodal".

The form of the molecular weight distribution curve, i.e. the appearance of the graph of the polymer weight fraction as function of its molecular weight, of such multimodal polyethylene will show two or more maxima or at least be distinctly broadened in comparison with the curves for individual fractions.

For example, if a polymer is produced in a sequential multistage process, utilising reactors coupled in series and using different conditions each reactor, the polymer fractions produced in different reactors will each have their own molecular weight distribution and weight average molecular weight. When the molecular weight distribution curve of such a polymer is recorded, the individual curves from these fractions are superimposed into the molecular weight distribution curve for total resulting polymer product, usually yielding a curve with two or more distinct maxima.

The polyethylene base resin of the composition of the invention is a multimodal-, or preferably a bimodal, polyethylene resin, which comprises at least two polyethylene fractions (A) and (B), wherein fraction (A) has a lower molecular weight than fraction (B). The term molecular weight where used herein denotes the weight average molecular weight M.

The polyethylene base resin of the present invention preferably has a molecular weight distribution (MWD) defined as the ratio of the weight average molecular weight $M_w$ and the number average molecular weight $M_n$ of 5 to 25, more preferably of 5 to 20, and most preferably of 5 to 15.

It is previously known that in order to produce multimodal, in particular bimodal, olefin polymers, such as the polyethylene base resin of the present invention, two or more reactors or zones connected in series as described in EP 517 868, which is hereby incorporated by way of reference in its entirety, can be used.

The main polymerisation stages are preferably carried out as a combination of slurry polymerisation/gas-phase polymerisation. The slurry polymerisation is preferably performed in a so-called loop reactor. Optionally and advantageously, the main polymerisation stages may be preceded by a prepolymerisation, in which case most preferably 1 to 5% by weight of the total amount of polymers is produced. The pre-polymer may be an ethylene homo- or copolymer.

If a pre-polymerisation takes place, in this case all of the catalyst is preferably charged into the first pre-polymerisation reactor and the pre-polymerisation is performed as slurry polymerisation. Such a polymerisation leads to less fine particles being produced in the following reactors and to a more homogeneous product being obtained in the end. Generally, this technique results in a multimodal polymer mixture through polymerisation with the aid of a catalyst, in the present invention with the aid of a single-site catalyst.

The single-site catalyst used in the examples of the present invention has been disclosed in EP 1 462 464, example 5, catalyst 3.

In the process of the invention for producing the base resin of the polymer composition of the invention, at least fraction (A) or fraction (B) are produced in a polymerisation reaction in the presence of a single-site catalyst. For example, fraction (A), or alternatively (B), may be produced in the presence of a single-site catalyst and fraction (B), or alternatively (A), may be produced in the presence of a Ziegler-Natta catalyst.

It is, however, preferred that both fractions (A) and (B) are prepared in the presence of a single-site catalyst.

Furthermore, it is preferred that fraction (A) and fraction (B) are polymerised in the presence of the same single-site catalyst.

In the production of a polyethylene base resin of the present invention it is preferred that fraction (A) is produced in a loop reactor under certain conditions with respect to hydrogen, monomer and comonomer concentration, temperature, pressure, and so forth.

Furthermore, it is preferred that fraction (B) is produced in a gas-phase reactor.

Still further, preferably, after the polymerisation fraction (A) including the catalyst is transferred to the reactor, preferably a gas-phase reactor, where fraction (B) is produced under different conditions.

The resulting end product consists of an intimate mixture of the polymers from the two main reactors and optionally the prepolymer fraction, the different molecular-weight-distribution curves of these polymers together forming a molecular-weight-distribution curve having a broad maximum or two maxima, i.e. the end product is a bimodal polymer mixture.

Owing to the flexibility with respect to reaction conditions thus obtained, it is most preferred that the polymerization is carried out in a pre-polymerization reactor/a loop reactor/a gas-phase reactor. Preferably, the polymerization conditions in the preferred three-step method are chosen so that fraction (A) is produced in one step, preferably the second reactor, whereas fraction (B) is produced in another step, preferably the third reactor. The order of these steps may, however, be reversed.

In the present invention it is preferred that the pre-polymerisation operates at a temperature between 40 to 70° C., more preferred between 50 to 65° C. and preferably at a pressure of 50 to 70 bar, more preferably of 55 to 65 bar.

In the second reactor the polymerisation temperature is preferably between 60 to 100° C., more preferably between 70 to 90° C., and preferably at a pressure of 40 to 70 bar, more preferably of 50 to 60 bar.

In the third reactor the temperature is preferably between 60 to 105° C., more preferably between 70 and 90° C. and preferably at a pressure of 10 to 40 bar, more preferably of 15 to 20 bar.

The weight ratio of fractions (A) and (B) is preferably from 60:40 to 40:60, more preferably 55:45 to 45:55.

In the present invention fraction (A) is an ethylene copolymer and fraction (B) can be an ethylene homo- or copolymer. It is preferred that also fraction (B) is an ethylene copolymer.

The used comonomers of both fractions may be equal or different.

As comonomers various alpha-olefins with 4 to 20 carbon atoms may be used, but the comonomers are preferably selected from the group of 1-butene, 1-pentene, 4-methyl-1-pentene, 1-hexene, 1-heptene, 1-octene, 1-decene and 1-eicosene. In particularly preferred embodiment, the comonomer is 1-butene and/or 1-hexene.

Preferably, fraction (B) is an ethylene copolymer, and the comonomer used is an alpha-olefin with 4, more preferably 6, or more carbon atoms, more preferably is 1-hexene or 1-octene.

At least on of the fractions (A) and (B) may also consist of ethylene and two or more different comonomer units, e.g. may consist of a terpolymer.

If the composition of the invention comprises a terpolymer, preferably this is a terpolymer of ethylene and $C_4$ to $C_{12}$ alpha-olefin-comonomers, and preferably the terpolymer is fraction (B).

The amount of the comonomer used in fraction (A) preferably is between 0.1 to 3.0 mole-%, more preferably 0.2 to 2.0 mole-%, even more preferably 0.5 to 1.5 mole-%.

The amount of the comonomer used in fraction (B) preferably is between 0.1 to 2.0 mole-%, more preferably 0.1 to 1.5 mole-%, even more preferably 0.2 to 1.0 mole-%.

Furthermore, it is preferred that fraction (A) has a density from 920 to 962 kg/m$^3$, more preferred from 925 to 945 kg/m$^3$, most preferred from 925 to 940 kg/m$^3$.

Moreover, the melt flow rate MFR$_2$ (190° C./2.16 kg) of fraction (A) preferably is between 10 to 300 g/10 min, more preferably between 50 to 140 g/10 min.

The polyethylene composition of the invention may also comprise additives like process aids, antioxidants, pigments, UV-stabilizers and the like. Usually, the amount of those additives is 10 wt % or lower, based on the total composition.

The present invention also relates to a pipe, in particular a pressure pipe, comprising the polyethylene composition as described hereinbefore, as well as to the use of such a composition for the production of a pipe, in particular a pressure pipe.

The pipe of the present invention may be prepared in any conventional manner, preferably by extrusion of the polyolefin composition in an extruder. This is a technique well known to the person skilled in the art.

The pipe of the present invention shows good stress resistance as well as a high flexibility.

METHODS AND EXAMPLES

Melt Flow Rate (MFR)

The MFR is determined according to ISO 1133 and is indicated in g/10 min. For polyethylene resins a temperature of 190° C. is applied. The MFR is determined at different loadings such as 2.16 kg (MFR$_2$), 5 kg (MFR$_5$) or 21.6 kg (MFR$_{21}$).

Molecular Weight

The weight average molecular weight M$_w$ and the molecular weight distribution (MWD=M$_w$/M$_n$, wherein M$_n$ is the number average molecular weight and M$_w$ is the weight average molecular weight) is measured by based on ISO 1014-4: 2003. A Waters 150CV plus instrument was used with column 3×HT&E styragel from Waters (divinylbenzene) and trichlorobenzene (TCB) as solvent at 140° C. The column set was calibrated using universal calibration with narrow MWD PS standards (the Mark Houwings constant K: 9.54*10$^{-5}$ and a: 0.725 for PS, and K: 3.92*10$^{-4}$ and a: 0.725 for PE). The ratio of M$_w$ and M$_n$ is a measure of the broadness of the distribution, since each is influenced by opposite end of the "population".

Rapid Crack Propagation (S4)

The rapid crack propagation (RCP) resistance of a pipe is determined according to ISO 13477 (E). According to the RCP-S4 method a pipe is tested which has an axial length not below 7 pipe diameters. The outer diameter of the pipe is about 110 mm or greater and its wall thickness about 10 mm or greater. When determining the RCP properties of a pipe in connection with the present invention the outer diameter and the wall thickness have been selected to be 110 mm and 10 mm respectively. While the exterior of the pipe is at ambient pressure (atmospheric pressure), the pipe is pressurized internally and the internal pressure in the pipe is kept constant at a pressure of 0.5 MPa positive pressure. The pipe and the equipment surrounding it are thermostated to a predetermined temperature. A number of discs have been mounted on a shaft inside the pipe to prevent decompression during the test. A knife projectile is shot, with well-defined forms, towards the pipe close to its end in the so-called initiating zone in order to start a rapidly running axial crack. The initiating zone is provided with an abutment for avoiding unnecessary deformation to the pipe. The test equipment is adjusted in such a manner that crack initiation takes place in the material involved and a number of tests are effected at varying temperatures. The axial crack length in the measuring zone, having a total length of 4.5 diameters, is measured for each test and is plotted against the set test temperature. If the crack length exceeds 4 diameters the crack is assessed to propagate. If the pipe passes the test at a given temperature, the temperature is lowered successively until a temperature ($T_{critical}$) is reached, at which the pipe no longer passes the test.

Pressure Test on Un-Notched Pipes

The pressure test on un-notched 32 mm pipes is carried out according to ISO 1167. The time to failure is determined in hours.

Pressure Test on Notched Pipes

The pressure test on notched 110 mm pipes is carried out according to ISO 13479.

Charpy Notch Impact Test

The impact strength is determined as Charpy Impact Strength according to ISO 179-1 non-instrumented or ISO 179-2 instrumented.

Flexural Modulus

The flexural modulus is determined according to ISO 178 at a constant speed of 2 mm/min.

E-modulus

The modulus of elasticity is determined according to ISO 527-2 (test specimen 1B), at a constant speed of 1 mm/min.

Rheological Parameters

Rheological parameters such as Shear Thinning Index SHI and viscosity are determined by using a rheometer, preferably a Physica MCR 300 Rheometer from Anton Paar. The definition and measurement conditions are described in detail on page 8, line 29 to page 11, line 25 of WO 00/22040.

EXAMPLES

Example 1

Into a 50 dm$^3$ loop reactor 32 kg/h propane and 8.3 g/h hydrogen and ethylene were added. The operating temperature was 60° C. and the operating pressure was 61 bar.

The slurry was taken out of the reactor and transferred into a 500 dm$^3$ loop reactor. The reactor was operated at 85° C. and 58 bar pressure. The single site catalyst prepared as disclosed in EP 1 462 464 was continuously fed at a rate of 29 g/min into the loop reactor. Additional ethylene, 1-butene, propane diluent and hydrogen were continuously introduced into the reactor so that the rate of polymer production was 35 kg/h and the MFR$_2$ of the polymer was 110 g/10 min and the density of polymer was 939 kg/m$^3$.

The slurry was continuously withdrawn from the reactor to a flash stage where hydrocarbons were removed from the polymer. The polymer was then transferred into a gas phase reactor, where the polymerisation was continued. The reactor was operated at 80° C. temperature and 20 bar pressure. Ethylene, hydrogen and 1-hexene were fed into the reactor to obtain such conditions that the rate of polymer production was 34 kg/h. The productivity of the catalyst was 2.4 kg/g catalyst.

The ratio between polymer amounts produced in the slurry (reactor 2) and gas phase (reactor 3) reactors was 51:49.

The polymer was then compounded in with 1500 ppm Calcium stearate and 3000 ppm Irganox B225. The final compound had a density of 937 kg/m$^3$ and MWD of 9.1.

The compounded material was then extruded into pipes having an external diameter of about 110 mm and thickness of about 10 mm and 32 mm and a thickness of 3 mm respectively.

Data of the polymerisation conditions, the resin/composition and the pipe produced therefrom are given in Table 1.

Comparative Example 1

A pipe resin was produced by means of a three-step process in a pre-polymerisation loop-reactor followed by first a loop-reactor and then a gas phase-reactor, as described in Example 1. The split was 2:42:56. No comonomer was used in the two consecutive loop-reactors, while 1-butene was used as comonomer in the high molecular weight fraction produced in the gas-phase reactor in an amount such that the 1-butene comonomer content of the total resulting polymer was 2.9% by weight. A Ziegler-Natta type catalyst as disclosed in EP 688 794 was used. The $M_n$ of the final polymer was found to be 8600 g/mol and the $M_w$ was 240000 g/mol. $M_w/M_n$ thus was 28. Further data are given in Table 1 below.

The material was then compounded with stabilisers and carbon black and extruded into pipes having an external diameter of about 110 mm and thickness of about 10 mm and a diameter of 32 mm and a thickness of 3 mm respectively.

TABLE 1

| | units | Example 1 | Comparative Example 1 |
|---|---|---|---|
| PREPOLYMERISATION REACTOR | | | |
| Temperature | ° C. | 60 | 50 |
| Pressure | bar | 61 | 64.2 |
| Split | wt-% | 0 | 2 |
| LOOP REACTOR | | | |
| Temperature | ° C. | 85 | 95 |
| Pressure | bar | 58 | 64 |
| C$_2$ concentration | mol % | 5.7 | 3.5 |
| H$_2$/C$_2$ ratio | mol/kmol | 0.46 | 950 |
| C$_4$/C$_2$ ratio | mol/kmol | 92 | 0 |
| Split | wt-% | 51 | 44 |
| MFR$_2$ | g/(10 min) | 110 | 325 |
| Density | kg/m$^3$ | 939 | 972 |
| Comonomer | | butene-1 | |
| GAS PHASE REACTOR | | | |
| Temperature | ° C. | 80 | 85 |
| Pressure | bar | 20 | 19.5 |
| H2/C2 ratio | mol/kmol | 0 | 50 |
| C4/C2 ratio | mol/kmol | — | 200 |
| C6/C2 ratio | mol/kmol | 4 | — |
| Split | wt-% | 49 | 54 |
| Comonomer | | Hexene-1 | Butene-1 |
| Density-base resin | kg/m$^3$ | 936 | 940 |
| COMPOUNDING | EXTRUDER | JSW CIM90P | JSWCIM460P |
| Feed | kg/hr | 217 | |
| SEI | kWh/t | 277 | 235 |
| Melt temperature | ° C. | 222 | 285 |
| PROPERTIES OF COMPOUNDED RESIN/PRODUCED PIPE | | | |
| Hexene-1 content | wt-% | 1.3 | 0 |
| Butene-1 content | wt-% | 1.6 | 2.9 |
| MFR2 | g/(10 min) | 0.45 | |
| MFR5 | g/(10 min) | 1.4 | 0.85 |
| MFR21 | g/(10 min) | | 19 |
| $M_w$ | g/mol | 157,000 | 240,000 |
| $M_n$ | g/mol | 17,200 | 8,600 |
| MWD | | 9.1 | 28 |
| Density-compound | kg/m$^3$ | 937.2 | 951 |
| SHI$_{(2.7/210)}$ | | 8.6 | 29.4 |
| SHI$_{(5/300)}$ | | 15.2 | 52.5 |
| Eta$_{0.05}$ | Pa s | 23450 | 52400 |

TABLE 1-continued

| | units | Example 1 | Comparative Example 1 |
|---|---|---|---|
| E-modulus | MPa | 640 | |
| Flexural Modulus | MPa | 596 | 845 |
| Impact strength at 0° C. | kJ/m$^2$ | 10 | 16 |
| Impact strength at −20° C. | kJ/m$^2$ | 5.9 | |
| Pressure test on un-notched 32 mm pipes | | | |
| 10.0 MPa at 20° C. | h | | >4719 |
| 12.0 MPa at 20° C. | h | 4144 | |
| 4.6 MPa at 80° C. | h | | 6321 |
| 5.1 MPa at 80° C. | h | | 2 |
| 5.4 MPa at 80° C. | h | 6259 | |
| Pressure test on notched 110 mm pipes | | | |
| 4.0 MPa at 80° C. | h | | >5000 |
| 4.45 MPa at 80° C. | h | 2731 | |
| RCP-resistance, T$_{critical}$ | ° C. | +1 | −4 |

The invention claimed is:

1. A polyethylene composition comprising, a polyethylene base resin, which comprises:
   a. an ethylene copolymer as fraction (A), and
   b. an ethylene homo- or copolymer as fraction (B),
   with fraction (A) having a lower molecular weight than fraction (B),
   wherein the polyethylene base resin is obtained by a polymerization process in which a single-site catalyst (SSC) is used in the polymerization of at least one of fractions (A) and (B), and the polyethylene base resin has:
   (i) a density of below 940 kg/m3, and
   (ii) a MFR2 at 190 20 C./2.16 kg of 0.01 to 10 g/10 min;
   wherein the polyethylene composition has a flexural modulus of from 400 to 820 MPa;
   wherein the polyethylene composition has a shear thinning index (SHI$_{2.7/2.10}$) below 20; and
   wherein a loop reactor, used in the polymerization process, is operated at a temperature of between 70 to 90° C.

2. The polyethylene composition according to claim 1, wherein the polyethylene composition has a Charpy impact strength at 0° C. of at least 10 kJ/m$^2$, measured according to ISO 179.

3. The polyethylene composition according to claim 1, wherein the polyethylene composition has a critical temperature in the RCP-S4 test of +2° C. or lower, measured according to ISO 13477.

4. The polyethylene composition according to claim 1, wherein the polyethylene composition has a slow crack growth value in a pipe notch test according to ISO 13479 at 80° C. and 5.4 MPa of at least 165 hours.

5. The polyethylene composition according to claim 1, wherein the polyethylene composition has an MRS rating of at least 6.3, measured according to ISO /TR 9080.

6. The polyethylene composition according to claim 1, wherein the molecular weight distribution of the polyethylene base resin is from 5 to 25.

7. The polyethylene composition according to claim 1, wherein fraction (A) is a copolymer of ethylene and $C_4$ to $C_{20}$ alpha-olefin comortomers.

8. The polyethylene composition according to claim 1, wherein fraction (A) has a density from 920 to 962 kg/m3.

9. The polyethylene composition according to claim 1, wherein fraction (A) has a melt flow rate (190° C. / 2.16 kg) MFR$_2$ of 10 to 300 g/10 min.

10. The polyethylene composition according to claim 1, wherein in the polyethylene base resin the weight ratio between fraction (A) and fraction (B) is between 60:40 to 40:60.

11. A pipe made of the polyethylene composition according to claim 1.

* * * * *